United States Patent
Mohr

(10) Patent No.: US 8,320,258 B2
(45) Date of Patent: Nov. 27, 2012

(54) METHOD AND DEVICE FOR RECOGNIZING A SYNCHRONIZATION MESSAGE FROM A WIRELESS TELECOMMUNICATION DEVICE

(75) Inventor: Karsten Mohr, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 1007 days.

(21) Appl. No.: 12/282,490

(22) PCT Filed: Mar. 15, 2006

(86) PCT No.: PCT/EP2006/060739
§ 371 (c)(1),
(2), (4) Date: Sep. 10, 2008

(87) PCT Pub. No.: WO2007/104362
PCT Pub. Date: Sep. 20, 2007

(65) Prior Publication Data
US 2009/0067401 A1    Mar. 12, 2009

(51) Int. Cl.
*H04J 3/14* (2006.01)
(52) U.S. Cl. .......................... 370/241; 370/310; 375/346
(58) Field of Classification Search .................. None
See application file for complete search history.

(56) References Cited

U.S. PATENT DOCUMENTS

| | | | | |
|---|---|---|---|---|
| 2002/0057727 | A1* | 5/2002 | Li | 375/146 |
| 2004/0042388 | A1 | 3/2004 | Yotsumoto et al. | |
| 2004/0042533 | A1 | 3/2004 | Nossen et al. | |
| 2005/0047530 | A1* | 3/2005 | Lee et al. | 375/343 |
| 2006/0078040 | A1* | 4/2006 | Sung et al. | 375/140 |

FOREIGN PATENT DOCUMENTS

WO    2005088865 A    9/2005

OTHER PUBLICATIONS

Zhen-Liang et al; "A sub-burst DFT scheme for CW burst detection in mobile satellite communication"; IEEE Journal on Selected Areas in Communication, 2000.

\* cited by examiner

*Primary Examiner* — Kevin C Harper

(57) ABSTRACT

A method of recognizing a synchronization message from a wireless telecommunications device comprising the steps of: dividing a series of known identification codes into a plurality of sections; processing and storing the sections of the known identification codes; dividing a signal received from the wireless telecommunications device into a plurality of sections; processing the sections of the received signal; and comparing the sections of the received signal with the sections of the known identification codes.

15 Claims, 7 Drawing Sheets

|   |     | 0    | 1    | 2    | 3    | ... | d/16-1 | n |
|---|-----|------|------|------|------|-----|--------|---|
| 0 | 0   | 0    | 16   | 32   | 48   | ... | 240    |   |
|   | 1   | 256  | 272  | 288  | 304  | ... | 496    |   |
|   | ... | ...  | ...  | ...  | ...  | ... | ...    |   |
|   | l-1 | 3840 | 3856 | 3872 | 3888 | ... | 4080   |   |
| 1 | 0   | 1    | 17   | 33   | 49   | ... | 241    |   |
|   | 1   | 257  | 273  | 289  | 305  | ... | 497    |   |
|   | ... | ...  | ...  | ...  | ...  | ... | ...    |   |
|   | l-1 | 3841 | 3857 | 3873 | 3889 | ... | 4081   |   |
| 2 | 0   | 2    | 18   | 34   | 50   | ... | 242    |   |
|   | ... | ...  | ...  | ...  | ...  | ... | ...    |   |
| 14| ... | ...  | ...  | ...  | ...  | ... | ...    |   |
|   | l-1 | 3854 | 3870 | 3886 | 3902 | ... | 4094   |   |
| 15| 0   | 15   | 31   | 47   | 63   | ... | 255    |   |
|   | 1   | 271  | 287  | 303  | 319  | ... | 511    |   |
|   | ... | ...  | ...  | ...  | ...  | ... | ...    |   |
|   | l-1 | 3855 | 3871 | 3887 | 3903 | ... | 4095   |   |
| s | v   |      |      |      |      |     |        |   |

|   |   | 0 | ... | d/16-1 | d/16 | ... | d/8-4 | d/8-3 | d/8-2 | d/8-1 | n |
|---|---|---|-----|--------|------|-----|-------|-------|-------|-------|---|
| 0 | 0 | ZERO | ... | ZERO | 240 | ... | 48 | 32 | 16 | 0 | |
|   | 1 | ZERO | ... | ZERO | 496 | ... | 304 | 288 | 272 | 256 | |
|   | ... | ... | ... | ... | ... | ... | ... | ... | ... | ... | |
|   | l-1 | ZERO | ... | ZERO | 4080 | ... | 3888 | 3872 | 3856 | 3840 | |
| 1 | 0 | ZERO | ... | ZERO | 241 | ... | 49 | 33 | 17 | 1 | |
|   | 1 | ZERO | ... | ZERO | 497 | ... | 305 | 289 | 273 | 257 | |
|   | ... | ... | ... | ... | ... | ... | ... | ... | ... | ... | |
|   | l-1 | ZERO | | ZERO | 4081 | ... | 3889 | 3873 | 3857 | 3841 | |
| 2 | 0 | ZERO | ... | ZERO | 242 | ... | 50 | 34 | 18 | 2 | |
|   | ... | ... | ... | ... | ... | ... | ... | ... | ... | ... | |
|   | ... | ... | ... | ... | ... | ... | ... | ... | ... | ... | |
| 14 | ... | ... | ... | ... | ... | ... | ... | ... | ... | ... | |
|   | l-1 | ZERO | ... | ZERO | 4094 | ... | 3902 | 3886 | 3870 | 3854 | |
| 15 | 0 | ZERO | ... | ZERO | 255 | ... | 63 | 47 | 31 | 15 | |
|   | 1 | ZERO | ... | ZERO | 511 | ... | 319 | 303 | 287 | 271 | |
|   | ... | ... | ... | ... | ... | ... | ... | ... | ... | ... | |
|   | l-1 | ZERO | ... | ZERO | 4095 | ... | 3903 | 3887 | 3871 | 3855 | |
| s | v | | | | | | | | | | |

FIG. 4

METHOD AND DEVICE FOR RECOGNIZING A SYNCHRONIZATION MESSAGE FROM A WIRELESS TELECOMMUNICATION DEVICE

FIELD OF THE INVENTION

The present invention relates to a method and device for recognizing a synchronization message received from a wireless telecommunications device.

BACKGROUND

The background to the invention will now be described with reference to the accompanying Figure in which:

FIG. 1 is a block diagram of a typical wireless telecommunication system.

Referring to FIG. 1, a typical wireless telecommunications system divides a geographical area into a plurality of cells 10 each of which comprises one or more base stations (Node B), wherein mobile user devices (UE) located within a cell 10 communicate with the base station (Node B) of that cell 10. More specifically, a base station (Node B) handles radio transmissions and reception to and from mobile user devices (UE) over a radio channel (R1), and is controlled by a radio network controller (RNC) that is connected to a core network (20).

In addition to radio channels (R1) for the transmission of voice or data traffic, a wireless telecommunications system also provides one or more channels for the broadcast of synchronization messages by mobile user devices. These broadcast messages enable the mobile user devices to synchronize their transceivers to the frame/slot/bit structures of a given base station.

Code Division Multiple Access (CDMA) is a multiple access technology in which users are separated by unique codes, so that all the users can use the same frequency and transmit at the same time. Recent developments in signal processing have made it possible to use CDMA for wireless communication. Wideband Code Division Multiple Access (WCDMA) is a recent advancement in CDMA technology that uses a wideband carrier signals.

Returning to the generic model of the wireless telecommunication system depicted in FIG. 1, WCDMA specifies the physical random access channel (PRACH) for the transmission of synchronization messages by a mobile user device (UE) to a base station (Node B) (wherein a random access channel (RACH) is the transport channel mapped to the PRACH).

The synchronization between a mobile user device and a base station is based on a hand-shaking type process, in which the mobile user device transmits a synchronization message containing an identification code (known as a preamble) to the base station. On receipt of the message, the base station compares the message's identification code with a set of predefined identification codes. If the base station recognizes the identification code of the synchronization message, it transmits a confirmation message back to the mobile user device. The receipt of the confirmation message by the mobile user device enables the device to estimate the propagation delay in the communication link between it and the base station.

In practice, a base station recognizes a preamble in a received signal, by correlating samples from the received signal with a known preamble scrambling code and preamble signature sequence. A RACH preamble is typically 1 msec in duration. This imposes a severe time constraint on the process of recognizing the preamble and is particularly problematic if the mobile user devices randomly use a number of different preambles, because a base station must correlate a received composite signal with all possible preamble scrambling codes and preamble signature sequences.

Delay spreading is a type of distortion caused when multiple reflections of a signal arrive (via different paths) at a base station at different times. The distortion results in the spreading or "smearing" of the received signal. Since the maximum delay spread of a preamble may differ depending on the cell size of a base station, the computational load of recognizing a preamble will also vary depending on this feature.

At present, the recognition of preambles is performed in the time domain with special hardware accelerators. However, it is known that correlation can also be calculated in the frequency domain. US Patent Application US2004042388 describes a correlation detection apparatus that receives a RACH signal from a mobile user device and subjects the signal to a Fast Fourier Transform (FFT). The apparatus also subjects RACH preamble codes stored therein to an FFT and multiplies the resulting spectrum of the RACH preamble codes with the spectrum of the received signal. The apparatus then transforms the result of the multiplication operation into the time domain (by means of an Inverse Fast Fourier Transform (IFFT)) to obtain a delay profile.

However, the apparatus described in US2004042388 requires a large amount of memory to process a signal. Furthermore, the apparatus does not improve the latency aspects of the preamble recognition process. Similarly, the apparatus described in US2004042388 uses a special FFT algorithm rather than a conventional FFT and/or IFFT algorithm. Finally, the apparatus described in US2004042388 does not merge the FFT and Fast Hadamard transform (FHT) for RACH signals.

SUMMARY OF THE INVENTION

The present invention provides a method and system for detecting preambles as described in the accompanying claims.

For the sake of simplicity, the method of detecting preambles according to the invention will henceforth be known as the improved preamble detection method. Similarly, synchronization signals received by a base station and transmitted from a mobile user device will henceforth be known as received RACH signals. Finally, the process by which a base station recognizes a preamble in a received RACH signal will henceforth be known as the preamble correlation process.

BRIEF DESCRIPTION OF THE DRAWINGS

An embodiment of the invention will now be described with reference to the accompanying Figures in which:

FIG. 2 is a table showing the partitioning, by the improved preamble detection method, of a known RACH preamble into a plurality of partial PN code vectors, for an example in which a delay spread (d)=256 chips, with different values of index (n), time interval (v) and signature bit (s);

FIG. 4 is a table of phase-reversed partial PN code vectors resulting from the zero padding and phase reversal of the partial PN code vectors of FIG. 2;

DETAILED DESCRIPTION

Overview

Figure 1:
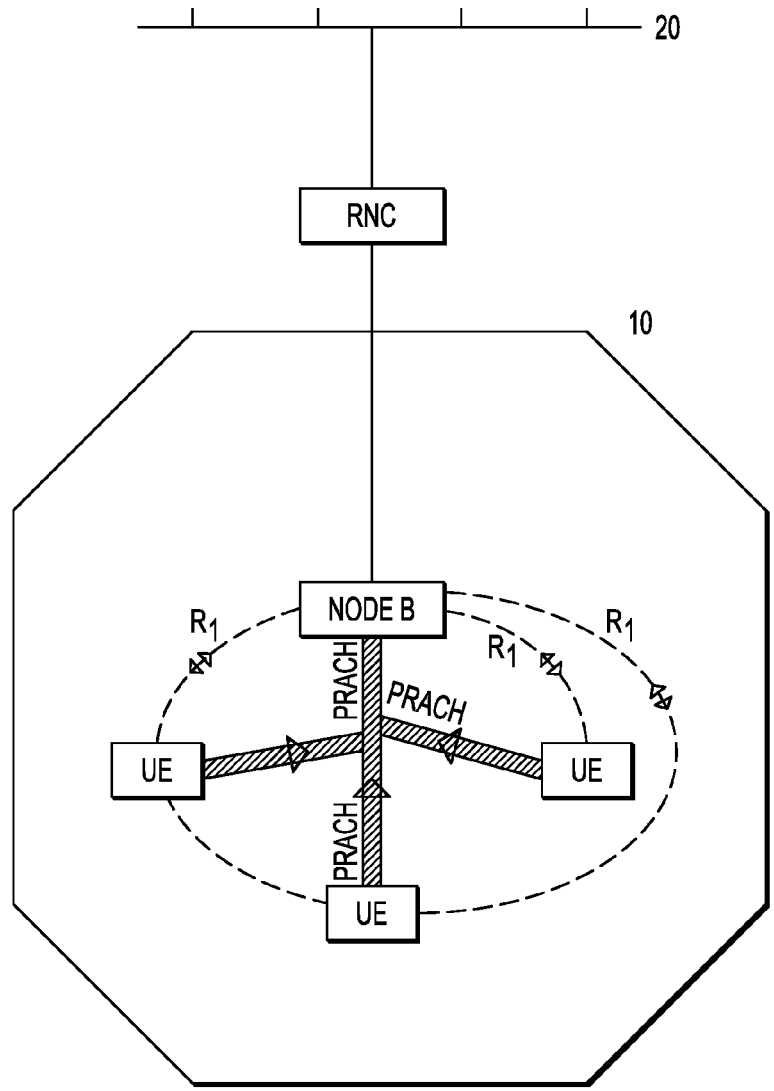
FIG. 1 is a block diagram of a typical wireless telecommunication system.

The following discussion will separately describe the offline operations and real-time operations of the improved preamble detection method. However, to facilitate such discussions, and in view of the importance of the frequency domain calculations in the improved preamble detection method, the following discussion will start with a brief review of the relationship between convolution and correlation in the time and frequency domains.

(1) Convolution and Correlation

The correlation of two functions g and f can be represented as $$\gamma(t) = \int_{-\infty}^{\infty} f(x-u)g(x)du$$

Similarly, the convolution of the two functions g and f can be represented by $$c(u) = f \cdot g = \int_{-\infty}^{\infty} f(x)g(u-x)dx$$

From this it can be seen that the convolution integral (f∘g) is very similar to the correlation integral ($\gamma(t)$). Indeed, the correlation theorem provides that the Fourier transform of a correlation integral (R(f∘g)) is equal to the product of the complex conjugate of the Fourier transform of the first function (F*) and the Fourier transform of the second function (G). This can be represented as $$R(f \circ g) = F^* G$$

In other words, the only difference between the Fourier transform of a correlation integral and the Fourier transform of a convolution integral is the presence of the complex conjugate (F*). The complex conjugate has the effect of reversing the phase (inverting the argument u-x) of the first function (f(x)).

If we take the first function to be the known preamble codes stored in a base station and the second function to be a received RACH signal, then the correlation between the known preamble codes and the received RACH signal can be calculated as follows:
(a) invert the order of the known preamble codes;
(b) calculate the Fourier transform of the inverted known preamble codes;
(c) calculate the Fourier transform of the received RACH signal;
(d) multiply the Fourier transform of the received RACH signal with the Fourier transform of the known preamble codes; and
(e) inverse transform the product from step (d).

Steps (a) and (b) of the above process may be performed at the start-up of a base station (i.e. are performed only once) and the resulting frequency domain representation of the inverted known preambles stored in memory for use in the subsequent steps. The subsequent steps are performed in real time at regular intervals.

Referring to steps (a) and (b), the entire corpus of known preambles constitutes a large amount of data. Consequently, the storage of the frequency domain representation of the known preambles requires a considerable amount of memory. As previously discussed, it is possible, in principle, to break up the set of known preambles into a series of smaller sections (known as partial PN code vectors) and separately calculate the Fourier transform of each such section.

However, since the data in each partial PN code vector is derived from the much larger deterministic set of known preamble codes, it would be expected that the data at the ends of each partial PN code vector should be influenced by data at the ends of the adjacent partial PN code vectors (i.e. adjacent sections from the larger data set of known preambles). However, the treatment of each partial PN code vector independently of the others means that such influence is not taken into account when calculating the Fourier transforms thereof. Looking at the above-defined time domain representations of the correlation and convolution integrals it can be seen that this is likely to be a serious problem when calculating the correlation between the known preamble codes and a received RACH signal.

There are a number of techniques for overcoming this problem including the overlap-add technique and the overlap-save technique. In the present embodiment, the overlap-add technique is used. However, it will be appreciated that other techniques could be used as appropriate.

2. Operations Performed at Start-Up
A. PN Code Pre-Partitioning

A preamble is a complex-valued sequence of a preamble scrambling code and preamble signature. A preamble signature is 4096 chips in length and comprises 256 repeats of 16 chip length Hadamard-Walsh sequences. There are 16 such signatures available.

The combination of the repeated real 16 chip long Hadamard signatures with the complex 4096 chip PN scrambling codes (i.e. pn(k) where k=0 to 4095), causes every $16^{th}$ PN code chip to be combined with the same preamble signature bit. As a result, the PN code can be split into 16 sections ps(m,s) (corresponding with one section per preamble signature bit (s)) as given by equation (2) below.

$$ps(m,s) = pn(16 \times m + s);$$

wherein m=0, 1, ..., 255 and s=0, 1, ..., 15

An initial estimate of delay spread (d) is obtained on start-up of a base station, and depending on the value of the delay spread (d) (in chips) the PN code may also be split into I=4096/d time intervals (v). Thus, the RACH preamble PN code can be decomposed into a three-dimensional code as follows:

$$p(n,v,s)=ps(16 \cdot n+v \cdot d,s)=pn(16 \cdot n+v \cdot d+s)$$

wherein d=32, 64, 128, 256 . . . ; n=0, 1, . . . , d/16−1 . . . ; and v=0, 1, . . . , I−1.

The above partitioning process results in the decomposition of the known RACH preamble PN codes into 16×I partial PN code vectors, wherein each such partial PN code vector comprises d/16 complex elements.

To clarify the above, let us take an example in which the delay spread (d) is 256 chips, v=0 and s=0. In this case, the known RACH preamble PN code can be decomposed into 16 partial PN code vectors (wherein each partial code vector comprises 16 complex elements). For example, and referring to FIG. 2, partial PN code vector p(n,0,0) can be described as follows:

$$p(n, 0, 0) = [pn(0), pn(16), pn(32), pn(48),$$
$$pn(64), pn(80), pn(96), pn(112), pn(128), pn(144),$$
$$pn(160), pn(176), pn(192), pn(208), pn(224), pn(240)]$$

Figure 3A:
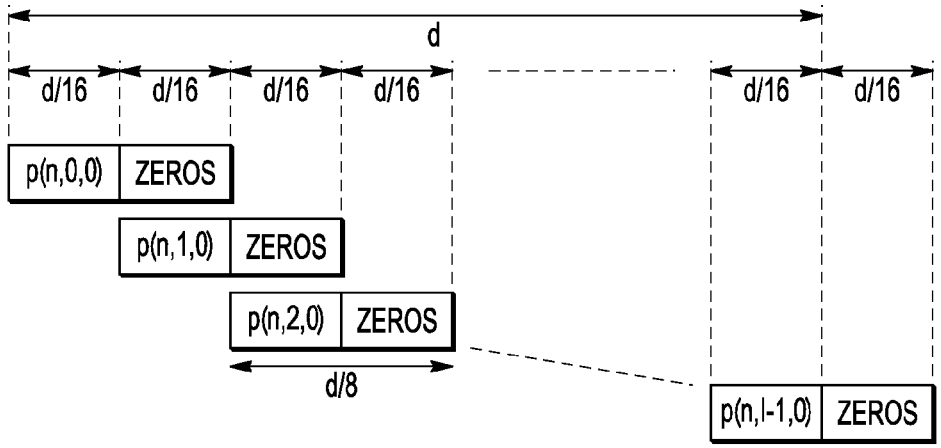
FIG. 3(a) is a block diagram of the zero padding of the plurality of partial PN code vectors employed in an overlap-adding technique in the improved preamble detection method, for an example in which s=0.
Figure 3B:
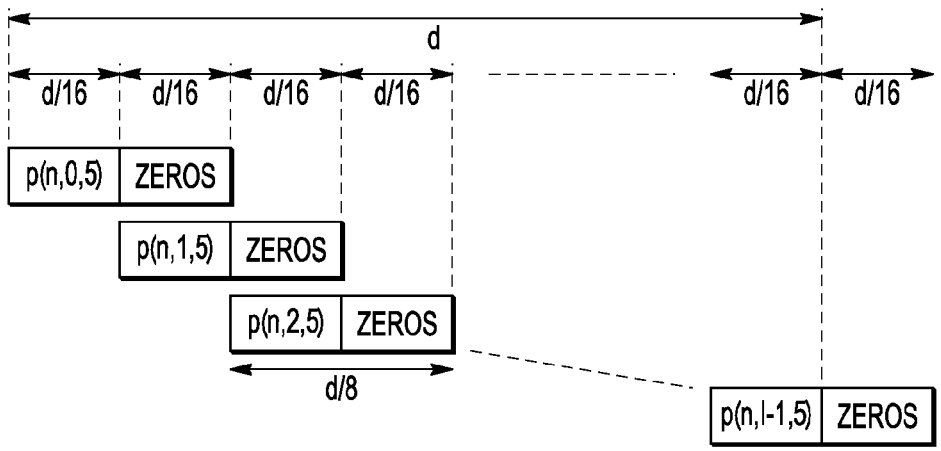
FIG. 3(b) is a block diagram of the zero padding of the plurality of partial PN code vectors employed in an overlap-adding technique in the improved preamble detection method, for an example in which s=5.

B. Overlap-Adding and Phase Reversal Prior to Transformation into the Frequency Domain Overlap-adding requires the zero padding of each partial PN code vector (so that each such vector is disjoint from the others and no wrap-around ambiguity appears in the final correlation integral). Referring to FIGS. 3(*a*) and 3(*b*), each partial PN code vector p(n,v,s) is appended with d/16 zeros (because, as will be recalled, each partial PN code vector comprises d/16 complex elements).

The element order of each zero-padded partial PN code vector is flipped left-for-right, to reverse the phase of the partial PN code vectors (and produce phase-reversed partial PN code vectors) and thereby rely on the correlation theorem to avoid the necessity of calculating the complex conjugates of the partial PN code vectors in the frequency domain.

Because of the zero-padding, the 16×I phase-reversed partial PN code vectors now have a length of d/8 complex elements each. The improved preamble detection method employs a standard radix d/8-point FFT repeated 16×I times (i.e. once for each of the 16×I phase-reversed partial PN code vectors) to transform each of the phase-reversed partial PN code vectors into the frequency domain. In other words, the FFT converts each phase-reversed partial PN code vectors p(n,v,s) into a partial RACH spectrum P(Ω, v, s). A standard radix FFT is employed for the transformation which is performed only once on startup of the base-station.

Accordingly, the overall memory requirement of calculating the FFT of all of the phase-reversed partial PN code vectors is d/8×(16×I)×4 bytes=32768 bytes independent of delay spread (wherein 4 bytes are required to accommodate each complex element). In other words, the memory required to calculate and store the frequency domain spectra of the partial PN code vectors in the improved preamble detection method is much smaller than that required to calculate and store the frequency domain spectrum of the entire corpus of preamble codes in other prior art approaches (such as that described in US2004042388).

Returning to the previous example, wherein d=256 chips, v=0 and s=0. After appending 16 zeros and flipping the code left-for-right, the resulting phase-reversed partial PN code vectors are shown in FIG. 4.

In particular, the first phase-reversed partial PN code vector comprises the elements
[0, 0, 0, 0, 0, 0, 0, 0, 0, 0, 0, 0, 0, 0, 0, 0, pn(240), pn(224), pn(208), pn(192), pn(176), pn(160), pn(144), pn(128), pn(112), pn(96), pn(80), pn(64), pn(48), pn(32), pn(16), pn(0)]

The phase-reversed partial PN code vectors in this example are transformed into the frequency domain with a 32-point FFT and represents the PN code elements from the known RACH preambles that are associated with the first signature bit (i.e. s=0) of the 16-bit Hadamard code.

In effect, each phase-reversed partial PN code vector has been generated by down-sampling the known RACH preambles, (i.e. by taking only every $16^{th}$ PN code element therefrom in accordance with the Hadamard code length). Returning to the sampling rate of the original known RACH preambles requires the addition of 16*f−1 zeros (wherein f is an oversampling factor) after every element of p(n,v,s), or repeating the spectra P(Ω,v,s) 16×f−1 times.

3. Operations Performed After Start-Up

A. Fractionalize and Transform Antenna Input Data

A received RACH signal is divided according to the delay spread (d) and over-sampling factor (f). In particular, in a first step, the received RACH signal is split into intervals that are d chips (d×f samples) long. Fractions are then generated therefrom by concatenating two of such intervals. In other words, the fractions are 2×d chips (2×d×f samples) long and half-overlapping.

In a second step, each fraction is transformed into the frequency domain using a standard radix (2×d×f)-point FFT, to generate the spectra A(Ω,v). Consequently, for every access slot, I=4096/d FFTs are performed. The comparatively small point size of the standard radix FFT employed for the transformation further reduces the computational demands of the improved preamble detection method. Furthermore, the computational effort required to perform the FFT is almost the same for all delay spreads. The larger the delay spread, the larger the FFT size, but the less the number of FFTs that need to be calculated. This is why the computational effort is the same for all delay spreads.

Figure 5:
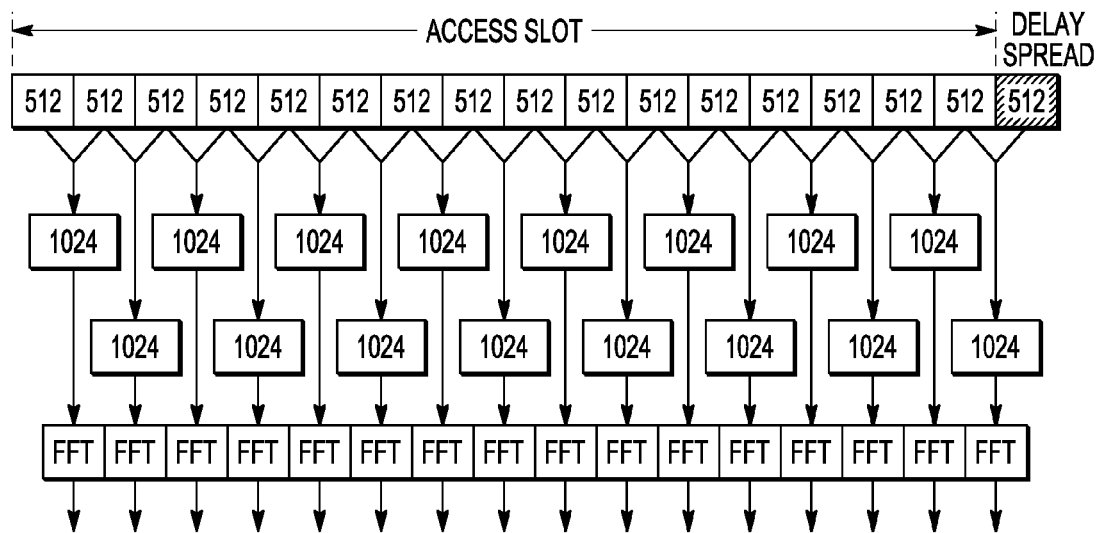
FIG. 5 is a block diagram showing the fractionalization of a received RACH signal for an example in which d=256 chips, oversampling factor (f)=2 and each access slot (4096 chips, 8192 samples) is split into equal sized I=16 intervals of 256 chips (or 512 samples) each.

An example of the fractionalization procedure is shown in FIG. 5 for a situation in which the delay spread (d) is 256 chips, the received RACH signal is oversampled by a factor of two (f=2) and each access slot (4096 chips, 8192 samples) is split into equal sized I=16 intervals of 256 chips (or 512 samples) each. One additional interval is required for the delay spread.

It should be noted that the latency of the afore-mentioned prior art correlation approaches is lower than that of the improved preamble detection method. In particular, correlation in the time domain can be performed immediately whereas when performing correlation in the frequency domain a number of data blocks must be acquired before processing can start. Nonetheless, the latency in the improved preamble detection method is minimized by the processing of the received signal in a fractionated manner. In particular, the latency of the correlation process would be considerably higher if an entire access slot had to be converted into the frequency domain.

B. Partial Correlation in Frequency Domain

As previously explained, the process of correlating (in the time domain) a received RACH signal with known RACH preamble is performed as less computationally demanding multiplication operation in the frequency domain. The substantially reduced computational demands provided by this approach are particularly advantageous when synchronizing with a base station operating within a large-sized cell.

Figure 6:
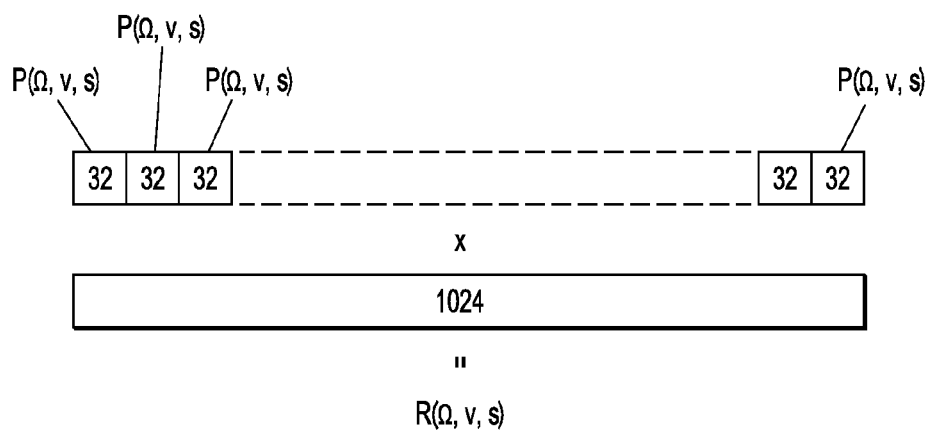
FIG. 6 is a block diagram of a repetition of a frequency domain spectrum of a phase-reversed partial PN code vector and its multiplication with the frequency domain spectrum of a received RACH signal fraction.

Referring to FIG. 6 and the previous example in which d=256 chips and f=2, since the phase-reversed partial PN code vectors (generated offline) are shorter than the received RACH signal fractions, the spectra of the phase-reversed partial PN code vectors P(Ω,v,s) are repeated 16×f times to fit the size of the spectra of the received RACH signal fractions A(Ω,v). This is possible because the phase-reversed partial PN code vectors have been generated by down-sampling in the time domain and performing the inverse operation in frequency domain means repetition of the spectrum.

Figure 7:
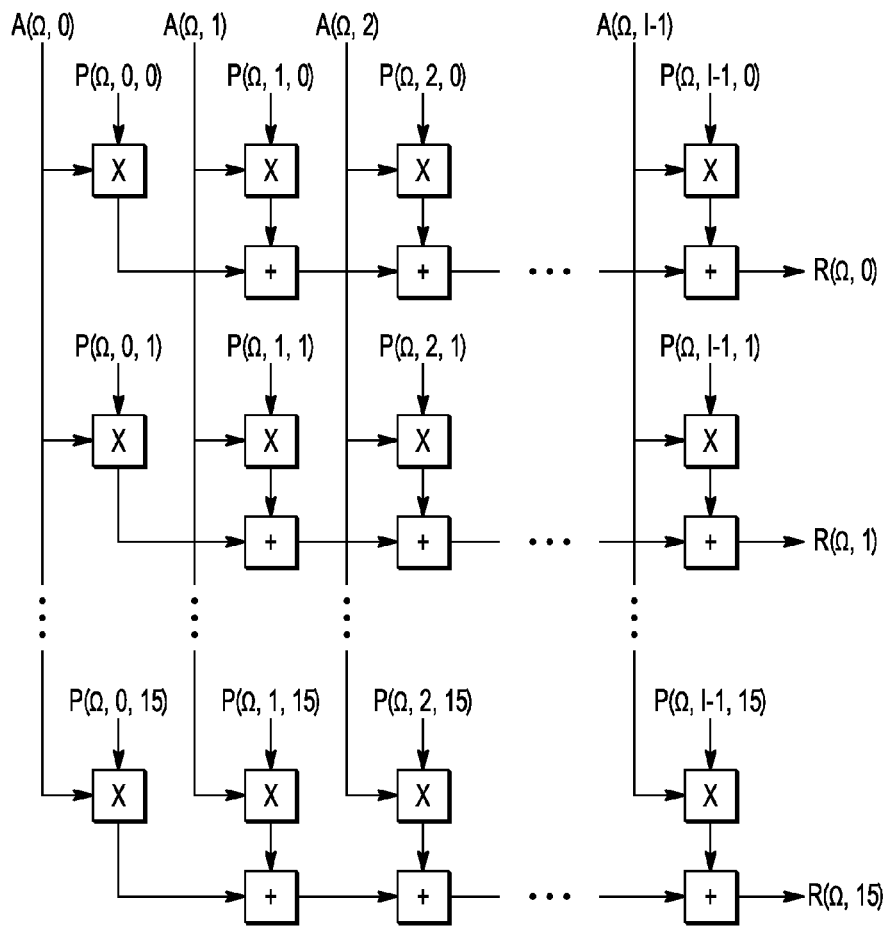
FIG. 7 is a block diagram of the element-wise complex multiplication of the repeated frequency domain spectrum of the phase-reversed partial PN code vector of FIG. 6 with the frequency domain spectrum of a received RACH signal fraction and accumulation of the resulting spectra to produce a plurality of partial correlation spectra.

The element-wise complex multiplication operation (in the frequency domain) must be performed for all Ω, v and s. Referring to FIG. 7, after the complex multiplication is performed and the resulting products in the frequency domain are accumulated, 16 partial correlation spectra R(Ω,s) are produced. This, in effect represents one partial correlation spectrum per preamble signature bit, wherein each such partial correlation spectrum is 2×d×f points long. Thus, overall (2×d×f)×I×16=131072×f complex MAC operations per access slot are required (independent of the delay spread).

C. Determining the Delay Profiles of the Preamble Signature Bits

Figure 8:
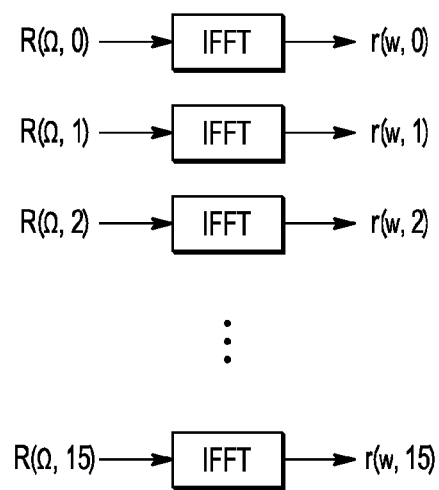
FIG. 8 is a block diagram of the IFFT of the partial correlation spectra of FIG. 7 into the time domain.

Referring to FIG. 8, all the 16 partial correlation spectra R(Ω,s) must be transformed back into the time domain to get the partial delay profiles for all 16 preamble signature bits. Therefore, 16 standard radix IFFTs must be performed, wherein each such IFFT is of 2×d×f points. The comparatively small point size of the standard radix IFFT employed for the transformation further reduces the computational demands of the improved preamble detection method.

After the transformation of the partial correlation spectra R(Ω,s) back into time domain partial delay profiles (r(w,0) to r(w,15)), a conventional Hadamard transform uses the 16 partial delay profiles to generate 16 signature delay profiles. The signature delay profiles are then searched for the presence of peaks using conventional peak-searching algorithms.

However, it should be noted that the Hadamard transform must take into account the different time-shifts in the partial delay profiles that have been introduced while generating the partial PN code vectors. In particular, because of the time shifts that were introduced while the partial PN code vectors were generated, the partial delay profiles need to be shifted (rotated) in time to align the delay for all the preamble signature bits. This can be done because of the cyclic nature of the FFT.

Nonetheless, it should be noted that the rotation does not require copying. Instead, pointer handling is sufficient. Furthermore, the Hadamard Transform needs to be performed only on half of each adjusted partial delay profile (d×f samples).

D. Hardware Implementations

Whilst, as previously mentioned, conventional correlation techniques require the use of HW accelerators, the improved preamble detection method could be performed in software on standard Digital Signal Processors (DSPs), Field Programmable Gate Arrays (FPGAs), Application Specific Integrated Circuit (ASICs) or any other type of hardware accelerator, since the standard FFT and IFFT algorithms employed in the improved preamble detection method are common functions in, for example, DSP libraries.

Finally, it should be appreciated that the improved preamble detection method is not restricted to use in WCMDA. Instead, the improved preamble detection method may be used in all direct-sequence spread spectrum CDMA systems using a combination of Hadamard (or similar) and PN sequences as spreading codes.

Alterations and modifications may be made to the above without departing from the scope of the invention. It will also be appreciated that the present invention is not limited to use in WCDMA RACH detection, but could instead be used in any similar system. Finally, it will be appreciated that the previously described advantages of the invention are exemplary. In particular, the previously described advantages or other advantages may be achieved by the above-described embodiment of the invention.

The invention claimed is:

1. A method of recognizing a synchronization message from a wireless telecommunications device comprising the steps of:
    (a) dividing a series of known identification codes into a plurality of sections p(n, v, s);
    (b) processing and storing the sections p(n, v, s) of the known identification codes;
    (c) dividing a signal received from the wireless telecommunications device into a plurality of sections a(v);
    (d) processing the sections a(v) of the received signal; and
    (e) comparing the sections a(v) of the received signal with the sections p(n, v, s) of the known identification codes, wherein the known identification codes are RACH preambles and step (a) comprises the step of dividing the RACH preambles according to the length of a preamble signature;
    wherein step (b) is preceded by a step of reversing the order of the elements of the sections p(n, v, s).

2. The method of claim 1 wherein the step of comparing the sections a(v) of the received signal with the sections p(n, v, s) of the known identification codes comprises the step of calculating the correlation between the sections a(v) of the received signal and the sections p(n, v, s) of the known identification codes.

3. The method of claim 1 wherein the steps (b) and (d) of processing the sections p(n, v, s) of the known identification codes and the sections a(v) of the received signal comprises the steps of transforming the sections into the frequency domain.

4. The method of claim 3 wherein step (b) is preceded by a step (a) of introducing elements of value zero into the sections p(n, v, s) of the known identification codes.

5. A wireless telecommunications synchronization message recognition device comprising a processor configured to:
    (a) a divide a series of known identification codes into a plurality of sections p(n, v, s);
    (b) process and store the sections p(n, v, s) of the known identification codes and reversing the order of the elements of the sections p(n, v, s);
    (c) divide a signal received from a wireless telecommunications device into a plurality of sections a(v);
    (d) a process the sections a(v) of the received signal; and
    (f) compare the sections a(v) of the received signal with the sections p(n, v, s) of the known identification codes, wherein the known identification codes are RACH preambles; and
    wherein dividing a series of known identification codes into a plurality of smaller sections p(n, v, s) comprises partitioning the RACH preambles according to the length of the preamble signature; and partitioning the RACH preambles according to the delay spread (d) of a transmission to the base station.

6. The device according to claim 5 wherein the processor is configured to compare the sections a(v) of the received signal with the sections p(n, v, s) of the known identification codes comprises by calculating the correlation between the sections a(v) of the received signal and the sections p(n, v, s) of the known identification codes.

7. The device according to claim 5 wherein processor is configured to process the sections p(n, v, s) of the known identification codes and the sections a(v) of the received signal by transforming the sections into the frequency domain.

8. The device according to claim 7 wherein the processor is configured to process the sections p(n, v, s) of the known identification codes by introducing elements of value zero into the sections p(n, v, s) of the known identification codes.

9. The device according to claim 7 wherein the processor is configured to transform sections into the frequency domain according to a standard radix Fast Fourier Transform.

10. The device of claim 5 wherein the processor comprises a digital signal processor.

11. The device of claim 5 wherein the processor comprises a field programmable gate array.

12. The device of claim 5, wherein the processor comprises an application specific integrated circuit.

13. Use of the method of claim 1 for recognizing a wideband code division multiple access synchronization message.

14. The method of claim 2 wherein the steps (b) and (d) of processing the sections p(n, v, s) of the known identification codes and the sections a(v) of the received signal comprises the steps of transforming the sections into the frequency domain.

15. The device according to claim 6 wherein the processor is configured to process the sections p(n, v, s) of the known identification codes and the sections a(v) of the received signal by transforming the sections into the frequency domain.

* * * * *